United States Patent
Mallela et al.

(10) Patent No.: US 10,629,042 B2
(45) Date of Patent: Apr. 21, 2020

(54) REMOTE DIAGNOSTICS FOR FLAME DETECTORS USING FIRE REPLAY TECHNIQUE

(71) Applicant: Honeywell International Inc., Morris Plains, NJ (US)

(72) Inventors: Bharat Kumar Mallela, Bangalore (IN); Akshay Krishnaji Ratnaparkhe, Pune (IN); Amit Garg, Bangalore (IN); Bindu Ganesh, Bangalore (IN); Sheetal Hanagandi, Bangalore (IN); Abhishek Mathur, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/112,047

(22) Filed: Aug. 24, 2018

(65) Prior Publication Data
US 2019/0066474 A1 Feb. 28, 2019

(30) Foreign Application Priority Data
Aug. 28, 2017 (IN) .............................. 201711030331

(51) Int. Cl.
*G08B 17/00* (2006.01)
*H04Q 9/00* (2006.01)
(Continued)

(52) U.S. Cl.
CPC .......... *G08B 17/00* (2013.01); *H04L 67/1097* (2013.01); *H04Q 9/00* (2013.01);
(Continued)

(58) Field of Classification Search
CPC .................................. G08B 17/00; H04Q 9/00
(Continued)

(56) References Cited

U.S. PATENT DOCUMENTS 8,988,232 B1 * 3/2015 Sloo .......................... F24F 11/30
340/602
9,407,881 B2 * 8/2016 Renkis ................... H04N 7/181
(Continued)

FOREIGN PATENT DOCUMENTS

CN 106997649 A 8/2017
KR 1020110108038 A 10/2011
(Continued)

OTHER PUBLICATIONS

Europe Patent Application No. 18190775.9, Extended European Search Report, dated Oct. 22, 2018, 11 pages.

*Primary Examiner* — Qutbuddin Ghulamali
(74) *Attorney, Agent, or Firm* — Wick Phillips Gould & Martin, LLP

(57) ABSTRACT

Embodiments relate generally to systems and methods for communicating data from a flame detector. A method may comprise detecting, by the flame detector, data related to a fire event; communicating, by the flame detector, the fire event data to a wireless device; forwarding, by the wireless device, the fire event data to a cloud database; accessing the fire event data, via the cloud database, by a central server controlled by an operator of the flame detector; analyzing, by the central server, the fire event data; automatically generating a report based on the analysis of the fire event data, by the central server; and communicating the generated report to a customer employing the flame detector.

8 Claims, 3 Drawing Sheets

(51) Int. Cl.
*H04L 29/08* (2006.01)
*G08B 29/18* (2006.01)
*G08B 25/10* (2006.01)

(52) U.S. Cl.
CPC ............ *G08B 25/10* (2013.01); *G08B 29/185* (2013.01); *H04Q 2209/43* (2013.01)

(58) Field of Classification Search
USPC .................................................... 340/870.07
See application file for complete search history.

(56) References Cited

U.S. PATENT DOCUMENTS

| | | | | |
|---|---|---|---|---|
| 2013/0039634 | A1* | 2/2013 | M .................... | G08B 13/19645 386/230 |
| 2015/0161882 | A1* | 6/2015 | Lett ..................... | G08B 25/001 340/506 |

FOREIGN PATENT DOCUMENTS

| | | | |
|---|---|---|---|
| WO | 2014072910 | A1 | 5/2014 |
| WO | 2017011504 | A1 | 1/2017 |

* cited by examiner

REMOTE DIAGNOSTICS FOR FLAME DETECTORS USING FIRE REPLAY TECHNIQUE

CROSS-REFERENCE TO RELATED APPLICATIONS

The present application claims priority to India Provisional Patent Application Serial No. 201711030331 filed Aug. 28, 2017 by Bharat Kumar Mallela, et al. and entitled "Remote Diagnostics for Flame Detectors Using Fire Replay Technique" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Flame detectors may be employed in many work environments where there is a possibility for fire. The flame detectors may have a field of view, where the flame detector may monitor the field of view and generate alerts or alarms based on the detected information in the field of view. The field of view of the flame detector may be oriented to focus on a particular source of potential fire or other similar hazard.

SUMMARY

In an embodiment, a method for communicating data from a flame detector may comprise detecting, by the flame detector, data related to a fire event; communicating, by the flame detector, the fire event data to a wireless device; forwarding, by the wireless device, the fire event data to a cloud database; accessing the fire event data, via the cloud database, by a central server controlled by an operator of the flame detector; analyzing, by the central server, the fire event data; automatically generating a report based on the analysis of the fire event data, by the central server; and communicating the generated report to a customer employing the flame detector.

In an embodiment, a communication system may comprise one or more flame detectors configured to detect electromagnetic radiation and to generate diagnostic data; one or more safety communicator devices configured to wirelessly communicate with the one or more flame detectors; and a cloud database configured to receive data generated by the one or more flame detectors via the one or more safety communicator devices, wherein the flame detector is employed by a customer and operated by a development team.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
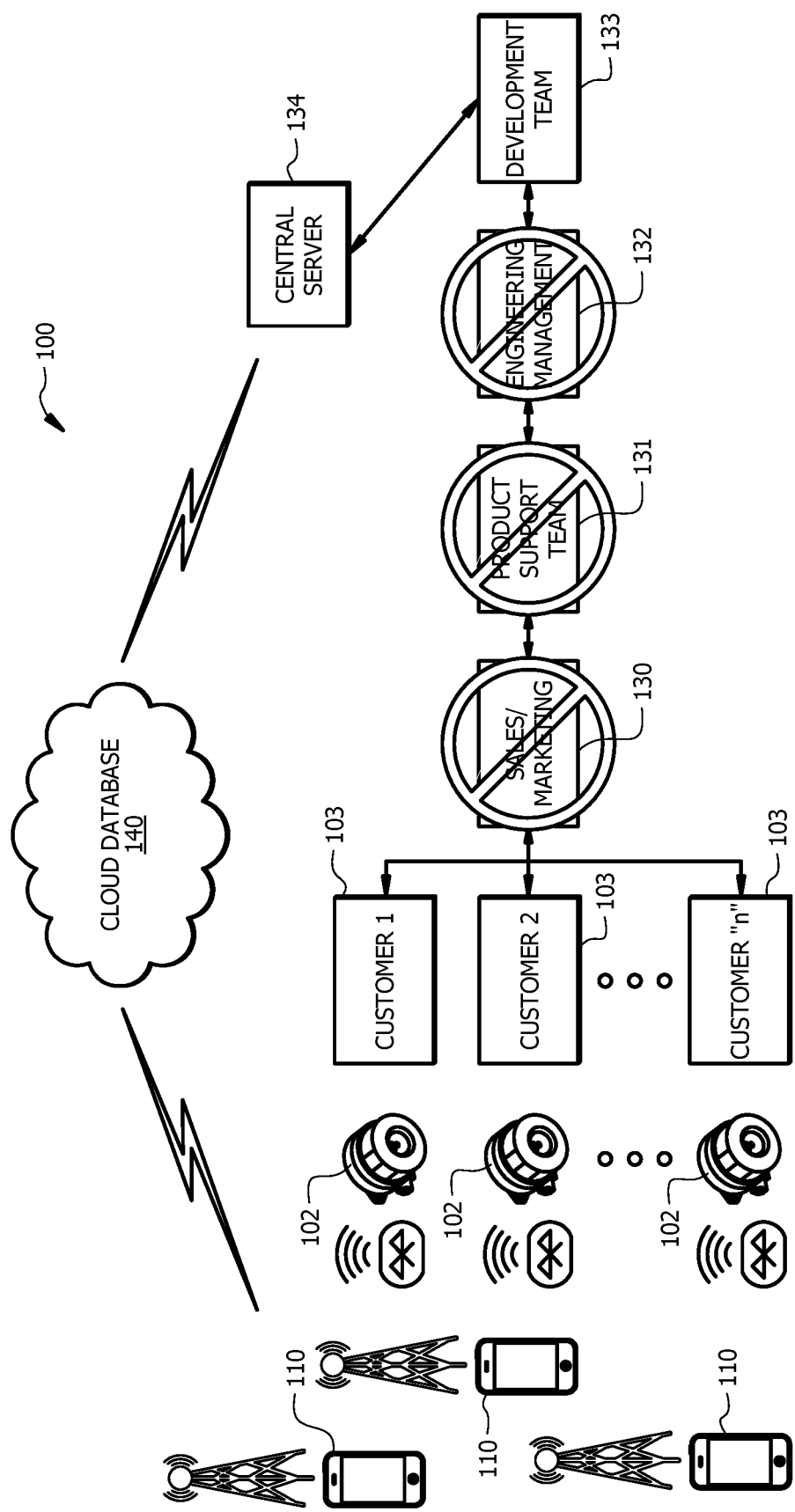
FIG. 1 illustrates a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, ±10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for remote diagnostics for flame detectors, in order to reduce processing communication latency times. In a typical work environment where there exists the possibility for fire hazards, a plurality of flame detectors may be employed. However, these flame detectors may frequently report alarms in the field because of unknown incidents occurring at a customer workplace, where diagnostics of these alarms may be provided by the operator of the flame detectors (where the operator may be separate from the customer employing the flame detectors). There is a need to provide on-field diagnostic services and remote monitoring, which will help in determining the cause of an alarm and in educating the customer in incidents that have occurred in their facility. These steps may improve in-field performance of the flame detectors, reliability and reduced false alarms, thereby encouraging trust from customers. These steps may also allow for identification of errors or problems with the flame detector that may require updates, maintenance, and/or repair.

A development team (typically not part of (e.g. with the development team part of a different organization/company than the customer, for example the company selling and/or operating/maintaining the flame detector(s) on behalf of the independent customer) and located separate and apart from the customer) may be responsible for receiving data from flame detectors, particularly with regards to alarms or alerts, and responding back to customers with a solution and/or escalating to further analysis of the data. However, within the management company, there may be a high amount of processing communication latency time (PCLT) involved in receiving and processing diagnostic information (e.g. pictures, real-time data, event logs, and radiation data).

Embodiments of the disclosure include a communication system with reduced PCLT and utilization of wireless communication devices to improve the response time for alarms or alerts generated by the flame detector(s). The communication system may utilize cloud-based remote diagnostics (RD) and fire replay technique (FRT) to receive and analyze data from the flame detector(s).

Industrial Internet of Things (IIOT) enabled remote diagnostics (RD) is a new monitoring and diagnostics model for flame detectors. This model benefits from cloud computing advantages and offers continuous diagnostic capabilities. It is a parallel processing model which removes layers in the process and escalating the issues further down a communication pathway. The disclosed communication system allows a development team to communicate with the flame director and/or customer directly. This may be accomplished by utilizing the wireless communication capabilities of safety communicator devices (or other such wireless devices) which may already be located near the flame detectors, as they are carried by workers in the area.

A flame detector may be configured to perform diagnostics (e.g. self-tests, communications checks, power supply diagnostics, and sensor calibrations) and communicate these via the safety communication devices to a cloud database, which may be accessed by the development team. Typically, the flame detectors do not contain cameras or microphones, and thus would not be configured to transmit video and/or audio associated with the alarm event. The flame detectors and the safety communicator devices may comprise wireless communication capabilities (such as Bluetooth, Wi-Fi, etc.) to allow them to communicate with each other and share diagnostics data with the cloud database periodically, continually, and/or on-demand. Whenever an issue is detected by the flame detector in the field, a worker carrying a safety communicator device (such as a maintenance engineer or safety manager) may upload data to the cloud database and a notification may be sent to the development team through the cloud. The development team may start processing the information immediately after receiving the notification.

Various measurements taken by the flame detector may be transmitted to the cloud database, via the safety communicator device(s), using a wireless (e.g. Wi-Fi) network. Once the data is received by the cloud database, algorithms (e.g. run by a central server) may process the data and generate notifications to the development team. In some embodiments, this may be accomplished by a central server in communication with the development team. Relevant information is then shared with the development team via e-mail, local access, etc. Additionally, reports may be automatically generated for communication with the customer.

Referring now to FIG. 1, a communication system 100 is shown. The communication system 100 may comprise one or more flame detectors 102 configured to detect electromagnetic radiation, where each of the flame detectors 102 may be associated with (and employed by) a customer 103. The communication system 100 may also comprise one or more safety communicator devices 110 carried by one or more workers within the area of the flame detectors 102.

In a typical situation, a communication system 100 may comprise one or more of a sales/marketing system 130, a product support team 131, an engineering management system 132, and a development team 133, where the data collected by each of the flame detectors 102 may be gathered and communicated by this flow of information. It may be important for a development team 133 to access specific data from flame detectors 102 to provide improvements, adjustments, and/or corrections to the customers 103 and their flame detectors 102. However, the information flow may be delayed by the many steps or systems between the customer 103 and the development team 133. Additionally, false alarms given by the flame detectors 102 may not be quickly identified by the development team 133 because of the long communication time/lag. In some embodiments, errors or problems with the flame detectors 102 that may require updates, maintenance, and/or repair may also be identified and communicated.

The communication system 100 shown in FIG. 1 may utilize the safety communicator device(s) 110 that are carried by workers in proximity to the flame detectors 102 to relay data (e.g., detected by sensor(s) within the flame detector) from the flame detectors 102 and upload it to a cloud database 140. A central server 134 (managed by the development team 133, for example) may pull data sets from the cloud database 140 to analyze and produce feedback for a customer 103 (or another monitoring service) based on the analyzed data.

The processing of the data (which may be completed by the flame detector 102, the safety communicator device 110, the cloud database 140, and/or the central server 134) may comprise converting the data using an analog to digital converter (ADC). Additionally, the data may be processed using a Fire Replay Technique (FRT) to simulate or replay the collected ADC data to establish actual fire scenario remotely, by means of providing collected ADC values as input.

In some embodiments, the development team 133 may use the diagnostics data from the flame detector 102 to reproduce or replicate the exact scenario remotely, using the FRT, where the development team 133 may simulate or replay back the collected diagnostic data from the flame detector 102 to establish an actual fire scenario remotely. In some embodiments, the data may be processed by analyzing the short and long band infrared spectrum (within the data from the flame detectors 102) to determine the type of fire (or other alarm event) that occurred. Additionally, customer explanations may be input by the customer 103 (e.g. using the safety communicator device 110) and associated with the received data, and the processing of the data may comprise cross analyzing whether the customers' explanation makes sense (such as a customer asserting that the smoke was caused by arc welding instead of a hydrocarbon fire). In some embodiments, the safety communicator 110 may receive the data from the flame detector 102, which may automatically trigger a response by the safety communicator 110 (e.g., forwarding the data and/or presenting a notification to the user). When a notification is presented to the user by the safety communicator 110, the notification may also comprise a request for the user to input information about the surroundings in the environment of the flame detector 102. For example, the notification may provide an opportunity for the worker to input an explanation for an alarm, alert, and/or error communicated by the flame detector 102.

In some embodiments, the central server 134 (e.g., with a processor) may be configured to pull specific scripts in response to analysis triggers (based on the analysis described above) and self-generate a report that is understandable for relay to a customer representative. These reports can also be compiled and used to provide recommendations for changing and/or updating the software/firmware used in the flame detectors 102.

Typical flame detectors 102 that are IR sensor based may not provide a way to identify an event as a nuisance alarm or false alarm. A nuisance alarm is the detector response to a friendly fire, such as a known or non-hazardous fire. A false alarm is the detector response to a non-fire event, such as modulated heated surface or the sun. If any such false alarm or nuisance alarm event occurs at the customer end, a worker (such as a maintenance engineer) may report the event by manually sending the diagnostic data of the flame detector 102 to the cloud database 140. When this type of event is reported by the customer 103, it may be considered a service support request by the development team to analyze what went wrong. The development team 133 may pull diagnostic data from the cloud database 140 (possibly via a central server 134), and replicate the actual scenario remotely using the fire replay technique described above to determine what went wrong.

The FRT may be accomplished using "Fire Pic" data. The Fire Pic data may comprise a collected set of flame detector (sensor behavioral) data at the instant of time (and perhaps in some instances from a period of time in proximity to the event, such as immediately preceding and/or immediately after the event) when an event has occurred. The FRT may consider this Fire Pic data as input to simulate all the fire scenarios (a piece of software code written on a machine or actual detector hardware considering all fire scenarios that trigger an alarm) and generate an analysis document as output. The analysis report may be pushed to the cloud database 140 from the development team 133 with a notification to the customer 103 that the report is available. Typically, the Fire Pic data does not include video or audio (since for example, the flame detector(s) typically would not include camera or microphone elements), and typically the FRT or other analysis would not use any video or audio information (although in other embodiments, video and/or audio might be used to assist in the analysis (in which instance the flame detector might include a camera and/or microphone)).

Additionally, errors or problems with the flame detectors 102 may be identified (e.g., by the flame detector, safety communicator, and/or central server 134), where the errors may require updates, maintenance, and/or repair. In some embodiments, the central server 134 may be configured to identify a problem or error with a flame detector 102 (e.g., in response to the FRT analysis), and generate (corresponding) instructions for correction, update, maintenance, and/or repair. These instructions may be communicated (e.g., through the cloud communication channel(s)) back to the flame detector 102 and/or to a user to make the repairs. In some embodiments, the central server 134 may generate instructions that are communicated to the flame detector 102 and the flame detector 102 may automatically implement, apply, or otherwise follow the instructions (for example, if correction or repair can be made by software updates). In some embodiments, the instructions may comprise programming, sensor adjustments, field-of-view adjustments, etc.

The described communication system 100 using a cloud-based approach to communicating between a customer 103 (and their flame detector(s) 102) and the operator (and development team 133) of the flame detector 102 offers a method for reducing the frequency of issues and false alarms, and decreasing the communication times between the customer 103 and the development team 133. Additionally, a data bank of flame detector data that is communicated via the cloud database 140 may be stored and accessed for future reference for the customer 103 and development team 133 (e.g., during FRT, the system might reference similar events by profile comparison, leading to recommended selections drawn from past similar events).

Figure 2:
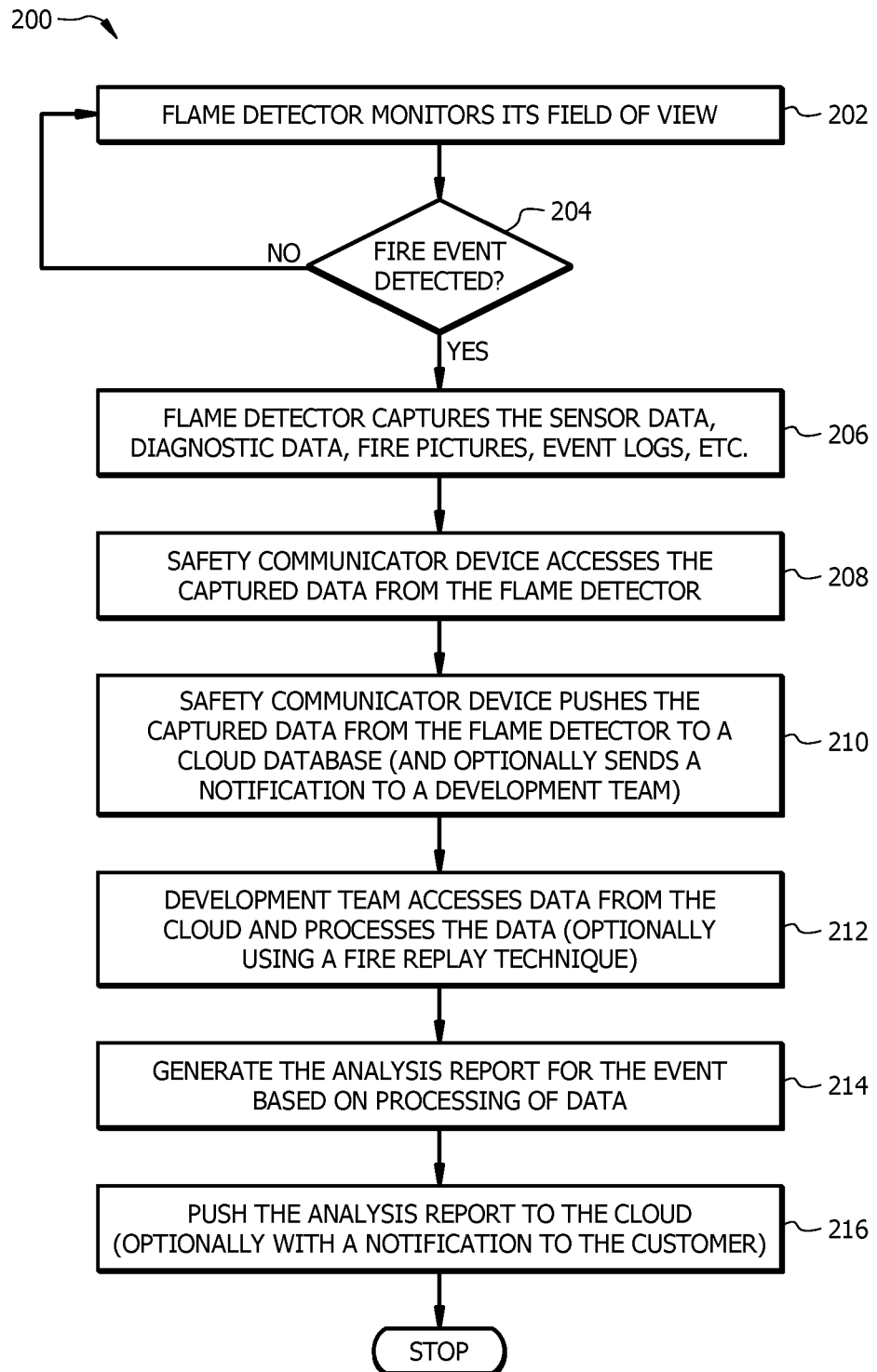
FIG. 2 illustrates a method for communicating and analyzing data generated by a flame detector according to an embodiment of the disclosure.

FIG. 2 illustrates an exemplary method 200 for collecting, processing, and communicating data from a flame detector. At step 202, the flame detector may monitor the available field of view. At step 204, the flame detector may determine if a fire event has been detected. If no fire event is detected, the method may continue from step 202. If a fire event is detected (e.g., by one or more sensor(s) and/or a processor of the flame detector assessing the sensor data), at step 206 the flame detector may capture the sensor data, diagnostic data, Fire Pics, event logs, and other pertinent information related to the fire event and at the time of the fire event. At step 208, a safety communicator device may access the captured data from the flame detector (which may occur at a time different than the fire event). This access may be accomplished in many ways, where the safety communicator device may request the data, and/or the flame detector may push the data to the safety communicator device (e.g. wirelessly, for example using Bluetooth or some other such short range communication means). At step 210, the safety communicator device may push (e.g. wirelessly, typically using a longer range means of communication such as Wi-Fi) the captured data from the flame detector to a cloud database (and may send a notification to a development team for the flame detector). Alternatively, the flame detector could comprise a longer range (wireless) communication means and directly push the captured data to a cloud database (although the Applicant believes that using a safety communicator device offers advantages regarding cost and/or the ability of the workers to provide/include context/comments along with the captured data). At step 212, the development team may access the data from the cloud database, and may process the data (for example, after receiving notification of the fire event and/or pushed out captured data). This processing may comprise using a fire replay technique (e.g. on a computer, such as a central server or a separate computer in communication with the central server). At step 214, the development team may generate an analysis report for the specific fire event using the processing of the data (e.g. using the fire replay technique). The analysis report may be generated manually (e.g. by the development team using their computer(s) to process the data and/or generate a report), or it may be generated automatically by a central server controlled by the development team. At step 216, the analysis report may be communicated (pushed) to the cloud database, and may be accessed by the customer. Optionally, a notification may also be sent to the customer directly, notifying them of the analysis report related to the fire event.

Figure 3:
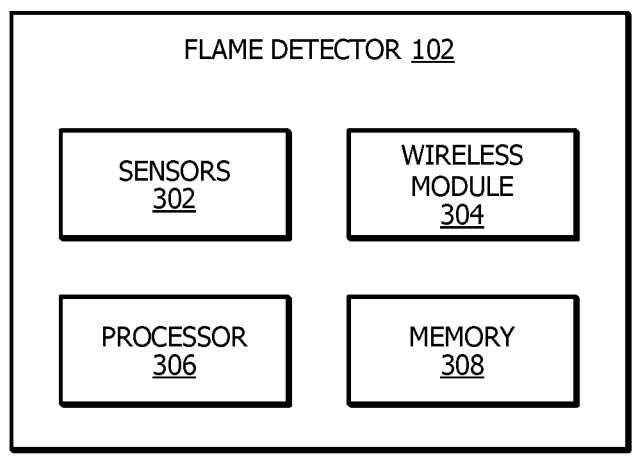
FIG. 3 illustrates a diagram of an exemplary flame detector according to an embodiment of the disclosure.

FIG. 3 illustrates an exemplary diagram of a flame detector 102 (as described above) wherein the flame detector 102 may comprise one or more sensors 302 (e.g., an IR sensor). In some embodiments, as described above, the flame detector 102 may comprise a wireless module 304 configured to allow the flame detector 102 to wirelessly communicate with other devices (e.g., the safety communicator and/or cloud server). In some embodiments, the flame detector 102 may comprise a processor 306 and a memory 308 configured to store and execute applications and processes as described above.

Having described various devices and methods herein, exemplary embodiments or aspects can include, but are not limited to:

In a first embodiment, a method for communicating data from a flame detector may comprise detecting, by the flame detector, data related to a fire event; communicating, by the flame detector, the fire event data to a wireless device; forwarding, by the wireless device, the fire event data to a cloud database; accessing the fire event data, via the cloud database, by a central server controlled by an operator of the flame detector; analyzing, by the central server, the fire event data; automatically generating a report based on the analysis of the fire event data, by the central server; and communicating the generated report to a customer employing the flame detector.

A second embodiment can include the method of the first embodiment, wherein the wireless device comprises a mobile device carried by a worker located in proximity to the flame detector.

A third embodiment can include the method of the first or second embodiments, further comprising processing the detected fire event data via an analog to digital converter of the flame detector.

A fourth embodiment can include the method of any of the first to third embodiments, wherein analyzing the fire event data comprises using a fire replay technique.

A fifth embodiment can include the method of any of the first to fourth embodiments, further comprising detecting, by the flame detector, electromagnetic radiation data, diagnostic data, sensor data, event logs, and other pertinent information related to the fire event.

A sixth embodiment can include the method of any of the first to fifth embodiments, wherein the fire event data comprises one or more of electromagnetic radiation data, diagnostic data, sensor data, event logs, and flame detector identification, flame detector location, flame detector history, flame detector health, and other pertinent information related to the fire event.

A seventh embodiment can include the method of any of the first to sixth embodiments, wherein the fire event data comprises one or more of electromagnetic radiation data, diagnostic data, sensor data, event logs, and other pertinent information related to the fire event.

An eighth embodiment can include the method of any of the first to seventh embodiments, wherein communicating the fire event data to the wireless device comprises extracting the fire event data from the flame detector, by the wireless device, using short-range wireless communication without affecting the operation of the flame detector.

A ninth embodiment can include the method of any of the first to eighth embodiments, further comprising sending a notification to the operator when the fire event data is forwarded to the cloud database.

A tenth embodiment can include the method of any of the first to ninth embodiments, further comprising sending a notification to the customer when the generated report is forwarded to the cloud database.

An eleventh embodiment can include the method of any of the first to tenth embodiments, further comprising storing fire event data and/or generated reports by the cloud database for a plurality of fire events.

In a twelfth embodiment, a communication system may comprise one or more flame detectors configured to detect electromagnetic radiation and to generate diagnostic data; one or more safety communicator devices configured to wirelessly communicate with the one or more flame detectors; and a cloud database configured to receive data generated by the one or more flame detectors via the one or more safety communicator devices, wherein the flame detector is employed by a customer and operated by a development team.

A thirteenth embodiment can include the communication system of the twelfth embodiment, wherein the customer manually sends data from the flame detector to the cloud database.

A fourteenth embodiment can include the communication system of the twelfth or thirteenth embodiments, wherein the one or more safety communicator device automatically sends data from the flame detector to the cloud database.

A fifteenth embodiment can include communication system of any of the twelfth to fourteenth embodiments, wherein the development team accesses the flame detector data from the cloud database.

A sixteenth embodiment can include communication system of any of the twelfth to fifteenth embodiments, further comprising a central server controlled by the development team configured to access the flame detector data, process the flame detector data, and automatically generate an analysis report based on the processing of the flame detector data.

A seventeenth embodiment can include communication system of any of the twelfth to sixteenth embodiments, wherein the central server uses a fire replay technique to process the flame detector data.

An eighteenth embodiment can include communication system of any of the twelfth to seventeenth embodiments, wherein the analysis report is communicated to the customer via the cloud database.

A nineteenth embodiment can include communication system of any of the twelfth to eighteenth embodiments, wherein the flame detector comprises a wireless communication module.

A twentieth embodiment can include communication system of any of the twelfth to nineteenth embodiments, wherein the flame detector communicates with the safety communicator device via Bluetooth.

A twenty-first embodiment can include communication system of any of the twelfth to twentieth embodiments, wherein the safety communicator device communicates with the cloud database via a Wi-Fi network.

A twenty-second embodiment can include communication system of any of the twelfth to twenty-first embodiments, further comprising an analog to digital converter configured to process the flame detector data.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication system comprising:
   one or more detectors configured to:
      detect an event based on ambient characteristics detected by the one or more detectors, wherein the ambient characteristics include at least one of an amount of electromagnetic radiation, fire pic data, and audio data in a field of view of the one or more detectors; and
      generate event data;
   one or more safety communicator devices in proximity to the one or more detectors, wherein the one or more safety communicator devices are configured to:
   wirelessly receive event data related to the detected event from the one or more detectors; and
   transmit the received event data to a cloud database, wherein the one or more detectors are employed by a customer and operated by a development team, and
   a central server configured to:
      access the event data from the cloud database,
      simulate the detected event based on the event data, accessed from the cloud database, to identify an error associated with the one or more detectors;
      generate instructions for correcting the identified error; and
      communicate the generated instructions to the one or more detectors for remote diagnosis of the one or more detectors.

2. The communication system of claim 1, wherein the customer manually sends data from the one or more detectors to the cloud database.

3. The communication system of claim 1, wherein the one or more safety communicator devices are further configured to transmit data from the one or more detectors to the cloud database.

4. The communication system of claim 1, wherein the central server is further configured to use a fire replay technique to process the event data.

5. The communication system of claim 1, wherein each of the one or more detectors comprises a wireless communication module.

6. The communication system of claim 1, wherein the one or more detectors are further configured to communicate with the one or more safety communicator devices via Bluetooth.

7. The communication system of claim 1, further comprising an analog to digital converter configured to process the event data.

8. A method for communicating data, the method comprising:
   in a wireless device:
      receiving, from a detector, event data, relating to an event, wherein the detector is in proximity to the wireless device,
         wherein the event corresponds to detection of electromagnetic radiation by the detector, and
         wherein the event data comprises one or more of electromagnetic radiation data, diagnostic data, sensor data, event logs, and detector identification, detector location, detector history, and detector health;
      forwarding, by the wireless device, the event data to a cloud database,
         wherein the event data is accessed by a central server, via the cloud database,
         wherein the central server simulates the event data to identify an error associated with the detector, wherein the central server generates instructions for correcting the identified error, and wherein the central server communicates the generated instructions to the detector for remote diagnosis of the detector.

\* \* \* \* \*